(12) United States Patent
Zhang et al.

(10) Patent No.: US 12,390,798 B2
(45) Date of Patent: Aug. 19, 2025

(54) PRECIOUS METAL CATALYST BRIQUETTES, PROCESS FOR THE MANUFACTURE AND FOR THE INCENERATION THEREOF

(71) Applicants: HERAEUS PRECIOUS METALS GMBH & CO. KG., Hanau (DE); Heraeus Precious Metal Technology (China) Co., Ltd., Nanjing (CN)

(72) Inventors: Bin Zhang, Jiangsu (CN); Zhengquan Hu, Shanghai (CN); Cunfei Fan, Sichuan (CN); Wengang Li, Jiangsu (CN); Gangfeng Liu, Shanghai (CN); Christian Mock, Hanau (DE); Bernhard Bauer-Siebenlist, Aschaffenburg (DE)

(73) Assignees: HERAEUS PRECIOUS METALS GMBH & CO. KG, Hanau (DE); HERAEUS PRECIOUS METAL TECHNOLOGY (CHINA) CO., LTD., Nanjing (CN)

( * ) Notice: Subject to any disclaimer, the term of this patent is extended or adjusted under 35 U.S.C. 154(b) by 146 days.

(21) Appl. No.: 17/250,228

(22) PCT Filed: Jun. 21, 2018

(86) PCT No.: PCT/CN2018/092182
§ 371 (c)(1),
(2) Date: Dec. 18, 2020

(87) PCT Pub. No.: WO2019/241957
PCT Pub. Date: Dec. 26, 2019

(65) Prior Publication Data
US 2021/0362133 A1    Nov. 25, 2021

(51) Int. Cl.
| | | |
|---|---|---|
| B01J 21/18 | (2006.01) |
| B01J 21/20 | (2006.01) |
| B01J 23/40 | (2006.01) |
| B01J 23/42 | (2006.01) |
| B01J 23/44 | (2006.01) |
| B01J 23/46 | (2006.01) |
| B01J 23/48 | (2006.01) |
| B01J 23/96 | (2006.01) |
| B01J 35/02 | (2006.01) |
| B01J 38/02 | (2006.01) |

(52) U.S. Cl.
CPC .............. *B01J 23/96* (2013.01); *B01J 38/02* (2013.01)

(58) Field of Classification Search
CPC ... B01J 21/18; B01J 21/20; B01J 23/40; B01J 23/42; B01J 23/44; B01J 23/46; B01J 23/48; B01J 23/96; B01J 35/02; B01J 38/02
See application file for complete search history.

(56) References Cited

U.S. PATENT DOCUMENTS

| | | | | |
|---|---|---|---|---|
| 5,037,785 A * | 8/1991 | Wilson | ..................... | B01J 38/12 204/157.41 |
| 5,183,789 A * | 2/1993 | Boyle | ..................... | B01J 38/12 502/52 |
| 5,529,963 A * | 6/1996 | Maschmeyer | .......... | B01J 23/94 502/41 |
| 5,854,162 A * | 12/1998 | Dufresne | ............. | C10G 35/085 502/50 |
| 7,585,803 B1 * | 9/2009 | Price | ....................... | B01J 8/085 208/140 |
| 7,592,283 B2 * | 9/2009 | Lee | .......................... | B01J 38/60 502/514 |
| 7,875,569 B2 * | 1/2011 | Roev | ..................... | B01J 37/0205 420/466 |
| 8,377,839 B2 * | 2/2013 | Galliou | ..................... | B01J 37/20 502/28 |
| 8,618,012 B2 * | 12/2013 | Niccum | ................... | B01J 38/12 502/41 |
| 8,859,835 B2 * | 10/2014 | Clem | ....................... | C07C 5/10 585/407 |
| 8,980,104 B2 * | 3/2015 | Sheintuch | ................ | C02F 1/70 210/507 |
| 9,238,216 B2 * | 1/2016 | Kim | ..................... | B01J 35/0013 |
| 9,468,922 B1 * | 10/2016 | Goodman | ............. | B01J 37/035 |
| 9,511,356 B2 * | 12/2016 | Vaidya | .................. | B01J 35/006 |
| 9,548,501 B2 * | 1/2017 | Zhong | .................. | H01M 4/921 |
| 9,566,567 B2 * | 2/2017 | Kim | ...................... | B01J 29/045 |
| 9,637,389 B2 * | 5/2017 | Mitchell, Sr. | ............. | B01J 23/44 |
| 9,834,496 B2 * | 12/2017 | Pretz | ...................... | B01J 38/02 |
| 9,884,314 B2 * | 2/2018 | Luo | .......................... | B01J 38/12 |
| 9,975,109 B2 * | 5/2018 | Bohringer | ............ | B01J 20/0225 |
| 10,403,906 B2 * | 9/2019 | Itoh | ....................... | H01M 4/926 |

(Continued)

FOREIGN PATENT DOCUMENTS

| | | |
|---|---|---|
| CN | 1045411 A | 9/1990 |
| CN | 102492846 A | 6/2012 |

(Continued)

OTHER PUBLICATIONS

International Search Report issued in PCT/CN2018/092182 dated Apr. 3, 2019.
Anonymous Burning Activated Carbon—Post on Gold Refining Forum.com, starting May 11, 2016 XP055630190, Retrieved from the Internet: URL:http://www.goldrefiningforum.com/phpBB3/viewtopic.php?f=38&t=24511 [retrieved on Oct. 9, 2019].
S. Sarioglan, Recovery of Palladium from Spent Activated Carbon-Supported Palladium Catalysts , Platinium Metals Review, vol. 57, No. 4, pp. 289-296, 2013, XP055873685, London, GB ISSN: 0032-1400, DOI: 10.1595/147106713X663988.
European Search Report issued in EP18923232.5 dated Jan. 10, 2022.

*Primary Examiner* — Cam N. Nguyen
(74) *Attorney, Agent, or Firm* — Blank Rome LLP

(57) ABSTRACT

A process for the incineration of precious metal catalyst briquettes, wherein the precious metal catalyst briquettes comprise precious metal catalyst, optionally water, and, also optionally, binder.

21 Claims, No Drawings

(56) References Cited

U.S. PATENT DOCUMENTS

| | | | |
|---|---|---|---|
| 10,490,828 B2* | 11/2019 | Kim | H01M 4/9083 |
| 10,722,867 B2* | 7/2020 | Diamond | B01J 23/52 |
| 10,903,504 B2* | 1/2021 | Kishimoto | H01M 4/9091 |
| 2005/0209098 A1* | 9/2005 | Gulla | B01J 23/8926 |
| | | | 502/185 |
| 2012/0007027 A1* | 1/2012 | Istvan | B01J 37/10 |
| | | | 252/502 |
| 2012/0129686 A1* | 5/2012 | Querner | B01J 37/0209 |
| | | | 502/185 |

FOREIGN PATENT DOCUMENTS

| | | |
|---|---|---|
| CN | 202747362 U | 2/2013 |
| CN | 107166403 A | 9/2017 |
| CN | 107794376 A | 3/2018 |
| KR | 20080041422 A | 5/2008 |
| WO | WO-2007036334 A2 | 4/2007 |
| WO | WO-2012173847 A2 | 12/2012 |

* cited by examiner

PRECIOUS METAL CATALYST BRIQUETTES, PROCESS FOR THE MANUFACTURE AND FOR THE INCENERATION THEREOF

CROSS REFERENCE TO RELATED APPLICATION

This application is a national stage of International Patent Application No. PCT/CN2018/092182, filed Jun. 21, 2018, the entire content of which is hereby incorporated by reference herein.

FIELD OF INVENTION

The invention relates to precious metal catalyst briquettes, in particular activated carbon-supported precious metal catalyst briquettes, and a process for the manufacture and incineration thereof. The invention relates in particular to activated carbon-supported precious metal catalyst briquettes and a process for the manufacture and incineration thereof, and it relates even more particular to spent activated carbon-supported precious metal catalyst briquettes and a process for the manufacture and incineration thereof.

BACKGROUND OF THE INVENTION

Precious metal catalysts are widely used in chemical, petroleum refining and automotive fields. However, after a certain period of use, such catalysts may suffer deactivation, for example, due to carbon deposition, oxidation, or other reasons. After several cycles of regeneration at the latest, the spent (exhausted) precious metal catalysts cannot be used again. These spent precious metal catalysts comprise a considerable content of precious metal and have become a secondary resource of extremely high recovery value. The existing methods for recovering precious metal from spent precious metal catalysts mainly comprise fire recovery methods and wet recovery methods. Said fire recovery methods, i.e. an incineration of spent precious metal catalysts requires the consumption of a large amount of energy. The incineration of spent precious metal catalysts is well known as a key step of fire recovery methods for precious metal enrichment by essentially burning off the precious metal catalysts' combustible support (carrier) such as activated carbon. For example, International Patent Publication No. WO 2007/036334 discloses such an incineration of precious metal catalysts.

In the present disclosure, a distinction is made between combustible activated carbon-supported precious metal catalysts and minimally combustible activated carbon-supported precious metal catalysts.

Combustible activated carbon-supported precious metal catalysts have a support of activated carbon which has an incineration behavior characterized by a weight loss of 50% after 25 to 28 minutes, wherein the weight loss is determined by TGA (thermogravimetric analysis) of a small (about 8 to 16 mg) powder sample of the respective activated carbon in air atmosphere with a start temperature of 200° C. and at a heating rate of 20° C. per minute. The 100% start weight of about 8 to 16 mg is determined at the start temperature of 200° C. Activated carbons from wood or peat are examples of activated carbon having such incineration behavior. Examples include commercially available activated carbon types, such as Norit® SX Plus manufactured by Cabot Corporation of Alpharetta, Georgia and Acticarbone® 3S and Acticarbone® CXV manufactured by Calgon Carbon Corporation of Moon Township, Pennsylvania.

Minimally combustible activated carbon-supported precious metal catalysts, on the other hand, have a support of activated carbon which has poor incineration behavior, which may be characterized by a weight loss of 50% after >28 minutes, for example, >28 to 35 minutes, wherein the weight loss is determined by the same TGA measurement method and under the same conditions as disclosed in the preceding paragraph. In case weight loss of 50% takes more than 35 minutes, the temperature is kept at and not raised above 800° C. Activated carbon from coconut shells is an example of such type of activated carbon with a poor incineration behavior (as defined above). Examples include commercially available activated carbon types, such as Desorex® C33 spezial and Carbopal® CCP 90 FF spezial, both manufactured by Donau Carbon GmbH of Frankfurt, Germany.

In the prior art, the traditional procedure of simply burning off activated carbon-supported precious metal catalyst powders within a chamber furnace may take too much time and may be ineffective, i.e. the removal of activated carbon may be undesirably insufficient. This increases processing time, energy consumption and thus costs. In view of these disadvantages, there is a strong desire for an improved process for the incineration of (spent) precious metal catalysts, in particular for the incineration of (spent) activated carbon-supported precious metal catalysts, and even more particular for the incineration of (spent) minimally combustible activated carbon-supported precious metal catalysts. Such improved process shall be distinguished by high combustion efficiency (high loss after incineration) and low ash LOI rate (ash loss of incineration rate, see definition below). To prevent misunderstandings, the term "loss" refers to mass loss or weight loss.

It has been found that the aforementioned desire can be satisfied by a process for the incineration of precious metal catalyst briquettes, in particular activated carbon-supported precious metal catalyst briquettes, wherein the precious metal catalyst briquettes comprise precious metal catalyst, in particular activated carbon-supported precious metal catalyst, optionally, water and, also optionally, binder. In the context a skilled person will understand "precious metal catalyst briquettes" as briquettes of precious metal catalyst, in particular of spent precious metal catalyst.

Definitions

For convenience, before further description of the present disclosure, certain terms employed in the specification and the examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" may refer to one or to more than one (i.e., to at least one) of the grammatical object of the article.

The term "and/or" includes the meanings "and", "or" and also all the other possible combinations of the elements connected to this term.

Throughout the description, including the claims, the term "comprising one" should be understood as being synonymous with the term "comprising at least one", unless otherwise specified. "Between" should be understood as being inclusive of the limits, unless otherwise specified.

It should be noted that in specifying any range of concentration, any particular upper concentration can be associated with any particular lower concentration.

It is specified that, in the continuation of the description, unless otherwise indicated, the values at the limits are included in the ranges of values which are given.

The terms "catalyst" or "supported catalyst" are often used interchangeably in the industry to refer to the catalyst composition comprising both, inert support and catalytically active material.

The term "precious metal catalyst" as used herein shall mean a heterogeneous catalyst comprising an at least partly combustible support equipped with at least one precious metal or, more precise, with at least one catalytically active precious metal. In other words, the heterogeneous catalyst comprises at least one precious metal loaded on an at least partly combustible support. The one or more precious metals may be present on an inner and/or on the outer surface of the at least partly combustible support in elemental form and/or in the form of one or more precious metal compounds such as, for example, precious metal oxides. The total precious metal content of such supported precious metal catalysts may lie in the range of, for example, 0.1 to 5 wt. % (weight %), in particular 0.1 to 1 wt. %.

The term "activated carbon-supported precious metal catalyst" as used throughout this disclosure and in the claims, shall mean a heterogeneous catalyst comprising an activated carbon-support (activated carbon-carrier, a support or carrier made of activated carbon) equipped with one or more precious metals, or, more precise, catalytically active precious metals. The activated carbon-support comprises or consists of activated carbon. The activated carbon may be of the combustible or of the minimally combustible type. The activated carbon may originate from various organic materials, for example, activated carbon from coal, wood, peat, fruit shell, walnut shell, apricot shell, date shell, coconut shell and the like. These carbonaceous materials can be converted into activated carbon by pyrolysis at an elevated temperature in an activation furnace. The one or more precious metals may be present on the inner and/or on the outer surface of the activated carbon in elemental form and/or in the form of one or more precious metal compounds such as, for example, precious metal oxides. The total precious metal content of such activated carbon-supported precious metal catalysts may lie in the range of, for example, 0.1 to 5 wt. %, in particular 0.1 to 1 wt. %. Such activated carbon-supported precious metal catalysts are well known to the person skilled in the art. They are used in various industrial chemical processes, in particular, in industrial hydrogenation processes.

The term "precious metal" as used throughout this disclosure and in the claims, shall mean one or more metals selected from the group consisting of copper (Cu), gold (Au), silver (Ag), palladium (Pd), platinum (Pt), rhodium (Rh), iridium (Ir), ruthenium (Ru), osmium (Os) and rhenium (Re), and in particular, selected from the group consisting of gold (Au), silver (Ag), palladium (Pd), platinum (Pt) and rhodium (Rh).

The term "loss of incineration (LOI) rate" as used throughout this disclosure and in the claims, is defined by the GB 18484-2001 standard, which refers to the percentage of the mass loss of the original incineration residue (=the percentage of the mass loss of the ash) after burning at 800° C. (±25° C.) for 3 hours in the mass of original incineration residue. The calculation method of the LOI rate is as follows:

$$P=(A-B)/A*100\%$$ Formula (I)

wherein P is the rate of loss of incineration; A is the mass of the original incineration residue after drying at room temperature; B is the mass of the incineration residue after calcination at 800° C. (±25° C.) for 3 hours and cooling down to room temperature.

DETAILED DESCRIPTION OF THE PRESENT INVENTION

An object of the present invention is to overcome one or more of the disadvantages present in the state of the art.

A first object of the invention is to provide a process for the incineration of precious metal catalyst briquettes, in particular a process for the incineration of activated carbon-supported precious metal catalyst briquettes, and even more particular a process for the incineration of spent activated carbon-supported precious metal catalyst briquettes.

According to the process of the invention, the shape and size of the precious metal catalyst briquettes may vary. For example, the precious metal catalyst briquettes may be in the form of honeycomb, cylinder, cone, sphere, half-sphere, prolate-spheroid, pyramid, oval and torus shape, preferably honeycomb, cylinder, sphere and half-sphere, more preferably honeycomb, cylinder, sphere, and sphere. The weight of an individual precious metal catalyst briquette may lie in the range of from 100 to 1000 g, preferably in the range of from 200 to 500 g, for example 250 g.

According to the process of the invention, the incineration process may be performed in an incineration furnace.

According to the process of the invention, the incineration process may be performed under supply of oxidizing gas which may lie in the range of 1000-2000 NM3/hour (standard cubic meters per hour) per 500 kg of precious metal catalyst briquettes. The oxidizing gas may be air or oxygen-enriched air with an oxygen content of up to 30 vol. %.

According to the process of the invention, the incineration process may be performed at an incineration temperature in the range of 600 to 1200° C., preferably in the range of 650 to 900° C. The incineration process may take in the range of from 2 to 8 hours, preferably in the range of from 3 to 6 hours. The incineration process may be carried out in one step or as a multi-step process, in particular a two-step process, i.e. the incineration may be repeated one, two or more times.

The second object of the invention is to provide precious metal catalyst briquettes, in particular activated carbon-supported precious metal catalyst briquettes. The precious metal catalyst briquettes comprise precious metal catalyst and, optionally, water and, also optionally, binder.

According to the second object of the invention, in an embodiment, the precious metal catalyst briquettes may comprise 50~98 wt. % of precious metal catalyst, 2-50 wt. % of water and, optionally, 0~20 wt. % of binder, wherein all amounts in wt. % are based on the total weight of the precious metal catalyst briquettes. In a partially or even completely dried variant they may comprise less or even no water, i.e. they may then comprise 60~100 wt. % of precious metal catalyst, 0-40 wt. % of water and, optionally, 0~20 wt. % of binder, wherein all amounts in wt. % are based on the total weight of the precious metal catalyst briquettes.

According to the second object of the invention, the precious metal catalyst comprises at least one precious metal loaded on an at least partly combustible support, or, in other words, it comprises an at least partly combustible support equipped with at least one precious metal.

According to the second object of the invention, in an embodiment, the at least partly combustible support is a carbonaceous-base material, preferably activated carbon, in particular activated carbon derived from coal, wood, fruit shell, coconut shell, walnut shell, apricot shell and/or date shell.

According to the second object of the invention, in an embodiment, the precious metal catalyst is a spent activated carbon-supported precious metal catalyst.

According to one embodiment of the invention, the spent activated carbon-supported precious metal catalyst is a Pd/C catalyst, i.e. an activated carbon-supported palladium catalyst.

According to the second object of the invention, the binder comprises water-dilutable or water-soluble organic material and, optionally, one or more than one additives.

According to the second object of the invention, the water-dilutable or water-soluble organic material is selected from the group consisting of modified starch, cellulose, polyvinyl pyrrolidone, polyvinyl alcohols, acrylate polymers, epoxide polymers, polyvinyl acetal and mixtures thereof; preferably, the water-dilutable or water-soluble organic material is modified starch selected from the group consisting of hydroxyethyl starch, hydroxypropyl starch, hydroxypropenyl starch, sodium carboxymethyl starch, cross-linked sodium carboxymethyl starch, sodium starch glycolate and mixtures thereof, preferably sodium carboxymethyl starch, cross-linked sodium carboxymethyl starch and mixtures thereof.

According to the second object of the invention, the at least one additive comprises one or more mineral fillers. The mineral fillers may be selected from the group consisting of montmorillonite, hectorite, saponite, serpentine, bentonite, kaolin, sepiolite, chlorite, attapulgite, palygorskite, bauxite, borax and mixtures thereof, preferably montmorillonite, bentonite, kaolin, attapulgite, borax and mixtures thereof.

According to an embodiment, the binder may comprise 0.3 to 5 pbw (parts by weight) of sodium carboxymethyl starch, 0 to 20 pbw of bentonite and 0 to 5 pbw of borax. In another embodiment, it may comprise 0.5 to 4 pbw of sodium carboxymethyl starch, 5 to 15 pbw of bentonite and 0.5 to 3 pbw of borax.

The third object of the invention is to provide a process for the manufacture of said precious metal catalyst briquettes, and in particular, a process for the manufacture of said activated carbon-supported precious metal catalyst briquettes. The process comprises the steps of:
  (a) optionally crushing precious metal catalyst to obtain precious metal catalyst powder;
  (b) mixing 50~98 wt. % of precious metal catalyst powder with 2~50 wt. % of water and, optionally, 0~20 wt. % of binder, wherein all amounts in wt. % are based on the total weight of the precious metal catalyst briquettes,
  (c) processing the mixture obtained in step (b) in a mold under a pressure of 200 KPa~1200 KPa to obtain briquettes;
  (d) removing the briquettes obtained in step (c) from said mold, and, optionally,
  (e) partially or completely drying the briquettes so obtained to remove water.

All definitions and preferences provided above for the process according to the first object of the invention and/or for the precious metal catalyst briquettes according to the second object of the invention equally apply to the process of the third object and vice versa.

Should the disclosure of any patents, patent applications, and publications, which are incorporated herein by reference conflict with the description of the present application to the extent that it may render a term unclear, the present description shall take precedence.

The invention will be described in more detail with reference to the following examples whose purpose is merely illustrative and not limitative of the scope of the invention.

EXAMPLES

Raw Materials and Devices
Spent activated carbon-supported precious metal catalyst A1, Pd/C—F catalyst commercially available from JiangShu Lianhua.
Spent activated carbon-supported precious metal catalyst A2, Pd/C catalyst commercially available form Dow-Corning and Sinopec.
Binder B1: Huahui® composite cellulose with high viscosity, commercial available from Hebei Baoding Shenghui Polymer Technology Co., Ltd.
Binder B2: mixture comprising 0.5 pbw of hydroxymethyl starch (CMS), 2.4 pbw of bentonite and 0.1 pbw of borax.
The briquette equipment (Closed-type briquette machine 120) commercially available from Henan Lantian mechanic manufacturing Company.
Preparation of Spent Activated Carbon-Supported Precious Metal Catalyst Briquette The spent activated carbon-supported catalyst was crushed and milled in size of less than 2 mm mesh. The spent activated carbon-supported precious metal catalyst, water and binder were mixed together, according to the recipes summarized in Table 1. The mixtures so obtained were processed into honeycomb briquettes in a mold under pressure of 300 KPa by briquette equipment.

Precious metal catalyst briquette recipes are summarized in the following table:

TABLE 1

Precious metal catalyst briquette recipes

Precious metal catalyst briquettes recipe

| Sample | Spent precious metal catalysts (kg) | | Binder (kg) | | Water (kg) |
| --- | --- | --- | --- | --- | --- |
| S1 | A1 | 100 | B1 | 6.25 | 25 |
| S2 | A2 | 100 | B2 | 3 | 40 |

Incineration of Spent Activated Carbon-Supported Precious Metal Catalyst Briquettes and Powders Example 1

The spent activated carbon-supported precious metal catalyst briquettes (S1) were loaded on trays in stack way. Then the trays with spent activated carbon-supported precious metal catalyst briquettes were put in a stainless steel incineration furnace for incineration at 800° C. for about 6 hours. The incineration process was performed under supply of 1500 NM3/hour of air per 500 kg precious metal catalyst briquettes. The spent activated carbon-supported precious metal catalyst briquettes burned to ashes, and then the shelf with ashes was taken out of furnace and cooled down in the air. The spent activated carbon-supported precious metal catalyst briquettes were incinerated in a stainless steel incineration furnace for two times. The ashes obtained in the $1^{st}$ incineration and the $2^{nd}$ incineration were collected for analysis, respectively. The loss of incineration (LOI) rate was measured according to GB 18484-2001 standard procedure.

Example 2

Incineration of spent activated carbon-supported precious metal catalyst briquettes (S1) was performed at the same condition as in example 1, except that the spent activated carbon-supported precious metal catalyst briquettes (S1) were loaded on trays in cross way.

Example 3

Incineration of spent activated carbon-supported precious metal catalyst briquettes (S2) was performed at the same condition as in example 1.

Example 4

Incineration of spent activated carbon-supported precious metal catalyst briquettes (S2) was performed at the same condition as in example 1, except that the spent activated carbon-supported precious metal catalyst briquettes (S2) were loaded on trays in cross way.

Comparative Example 1

The spent activated carbon-supported precious metal catalyst powders (A1) were loaded on trays. Then the trays with spent activated carbon-supported precious metal catalyst powders were put in a stainless steel incineration furnace for twice incineration at 800° C. for 6 hours.

Comparative Example 2

Incineration of spent activated carbon-supported precious metal catalyst powders (A2) were performed at the same condition as in comparative example 1.

The spent activated carbon-supported precious metal catalyst ash LOI rates are summarized in the following table:

TABLE 2

| EX | materials | briquette | Loading style | 1st incineration ||||  2nd incineration ||||
|---|---|---|---|---|---|---|---|---|---|---|---|
| | | | | Weight before incineration (Kg) | Weight after incineration (Kg) | Loss after incineration | Ash LOI rate | Weight before incineration (Kg) | Weight after incineration (Kg) | Loss after incineration | Ash LOI rate |
| E1 | S1 | yes | stack | 22.30 | 1.53 | 93.16% | 15.81% | 2.90 | 2.38 | 17.96% | 0.29% |
| E2 | S1 | yes | cross | 26.52 | 1.35 | 94.90% | | | | | |
| C1 | A1 | no | * | 18.19 | 2.85 | 84.34% | 47.40% | 6.29 | 3.30 | 47.57% | 27.06% |
| E3 | S2 | yes | stack | 26.72 | 1.78 | 93.32% | 74.98% | 4.65 | 2.23 | 51.93% | 42.87% |
| E4 | S2 | yes | cross | 30.42 | 2.86 | 90.60% | | | | | |
| C2 | A2 | no | * | 24.00 | 13.03 | 45.73% | 94.35% | 13.03 | 10.64 | 18.36% | 90.67% |

* Spent activated carbon-supported precious metal catalyst powders loaded on trays evenly.

As can be seen from the ash LOI rate listed in Table 2, compared with the spent activated carbon-supported precious metal catalyst powders, the spent activated carbon-supported precious metal catalyst briquettes have low ash LOI rate, and show high combustion efficiency.

The invention claimed is:

1. A process for the incineration of precious metal catalyst briquettes comprising incinerating precious metal catalyst briquettes under supply of an oxidizing gas, wherein the precious metal catalyst briquettes comprise:
   a precious metal catalyst comprising at least one precious metal loaded on an at least partly combustible support,
   a binder comprising:
      a water-dilutable or water-soluble organic material, and
      one or more additives comprising one or more mineral fillers, and
   optionally, water.

2. The process of claim 1, wherein the precious metal catalyst briquettes comprise:
   50-98 wt. % of the precious metal catalyst, 2-50 wt. % of water and up to 20 wt. % of the binder,
   wherein all amounts in wt. % are based on the total weight of the precious metal catalyst briquettes.

3. The process of claim 1, wherein the precious metal catalyst briquettes are in a form selected from the group consisting of a honeycomb, a cylinder, a cone, a sphere, a half-sphere, a prolate-spheroid, a pyramid, an oval and a torus shape.

4. The process of claim 1, wherein the at least one precious metal is selected from the group consisting of copper (Cu), gold (Au), silver (Ag), palladium (Pd), platinum (Pt), rhodium (Rh), iridium (Ir), ruthenium (Ru), osmium (Os) and Rhenium (Re).

5. The process of claim 1, wherein the at least partly combustible support is a carbonaceous-base material.

6. The process of claim 5, wherein the carbonaceous-base material is an activated carbon.

7. The process of claim 6, wherein the activated carbon is derived from coal, wood, fruit shells, coconut shells, walnut shells, apricot shells and/or date shells.

8. The process of claim 1, wherein the precious metal catalyst is a spent activated carbon-supported precious metal catalyst.

9. The process of claim 1, wherein the one or more mineral fillers are selected from the group consisting of montmorillonite, hectorite, saponite, serpentine, bentonite, kaolin, sepiolite, chlorite, attapulgite, palygorskite, bauxite, borax and mixtures thereof.

10. The process of claim 1, wherein the water-dilutable or water-soluble organic material is selected from the group consisting of modified starch, cellulose, polyvinyl pyrrolidone, polyvinyl alcohols, acrylate polymers, epoxide polymers, polyvinyl acetal and mixtures thereof.

11. The process of claim 1, wherein the supply of the oxidizing gas in the range of 1000-2000 NM3/hour per 500 kg of precious metal catalyst briquettes.

12. The process of claim 11, wherein the oxidizing gas is air or an oxygen-enriched air with an oxygen content of up to 30 vol. %.

13. The process of claim 1, wherein the incineration process is performed at an incineration temperature in the range of 600 to 1200° C.

14. The process of claim 1, wherein the at least one precious metal is selected from the group consisting of gold (Au), silver (Ag), palladium (Pd), platinum (Pt) and rhodium (Rh).

15. The process of claim 1, wherein the incineration process is performed at an incineration temperature in the range of 650 to 900° C.

16. The process of claim 1, wherein the precious metal catalyst briquettes comprise water.

17. The process of claim 1, wherein the precious metal catalyst briquettes are prepared by a process comprising:
   (a) forming a precious metal catalyst powder from a precious metal catalyst;
   (b) mixing 50-98 wt. % of the precious metal catalyst powder with 2-50 wt. % of water and, a binder in an amount of up to 20 wt % to form a mixture, wherein all amounts in wt. % are based on the total weight of the precious metal catalyst briquette,
   (c) processing the mixture obtained in step (b) in a mold under a pressure of 200 KPa-1200 KPa to obtain precious metal catalyst briquettes;
   (d) removing the briquettes obtained in step (c) from said mold, and, optionally,
   (e) partially or completely drying the precious metal catalyst briquettes to remove water.

18. The process of claim 1, wherein the one or more mineral fillers are selected from the group consisting of montmorillonite, bentonite, kaolin, attapulgite, borax and mixtures thereof.

19. A precious metal catalyst briquette comprising:
   at least one precious metal catalyst,
   a binder comprising:
      a water-dilutable or water-soluble organic material, and
      one or more additives comprising one or more mineral fillers, and
   optionally water,
   wherein the precious metal catalyst comprises at least one precious metal loaded on an at least partly combustible support, and wherein the at least one precious metal is selected from the group consisting of copper (Cu), gold (Au), silver (Ag), palladium (Pd), platinum (Pt), rhodium (Rh), iridium (Ir), ruthenium (Ru), osmium (Os) and Rhenium (Re).

20. A process for the manufacture of the precious metal catalyst briquette of claim 19, said process comprising the steps of:
   (a) crushing a precious metal catalyst to obtain a precious metal catalyst powder;
   (b) mixing 50-98 wt. % of the precious metal catalyst powder with 2-50 wt. % of water and up to 20 wt. % of the binder to form a mixture, wherein all amounts in wt. % are based on the total weight of the precious metal catalyst briquette,
   (c) processing the mixture obtained in step (b) in a mold under a pressure of 200 KPa-1200 KPa to obtain precious metal catalyst briquettes;
   (d) removing the briquettes obtained in step (c) from said mold, and, optionally,
   (e) partially or completely drying the precious metal catalyst briquettes to remove water.

21. The process of claim 1, wherein the precious metal catalyst briquettes are in a form selected from the group consisting of a honeycomb, a cylinder, a sphere and a half-sphere.

* * * * *